United States Patent [19]
Shank, Jr.

[11] Patent Number: 5,402,939
[45] Date of Patent: Apr. 4, 1995

[54] BLAST NOZZLE HOLDER

[75] Inventor: James D. Shank, Jr., Vestal, N.Y.

[73] Assignee: Church & Dwight Co., Inc., Princeton, N.J.

[21] Appl. No.: 171,670

[22] Filed: Dec. 22, 1993

[51] Int. Cl.$^6$ .......................... B05B 1/00; F16L 33/00
[52] U.S. Cl. ...................................... 239/600; 285/249
[58] Field of Search ...................... 285/248, 249, 238; 239/600, 597, DIG. 21, 230, 532

[56] References Cited

U.S. PATENT DOCUMENTS

| | | | |
|---|---|---|---|
| 2,460,653 | 2/1949 | Raybould | 285/249 |
| 2,464,416 | 3/1949 | Raybould | 285/249 |
| 2,470,538 | 5/1949 | Wolfram et al. | 285/249 |
| 2,541,200 | 2/1951 | Brubaker | 285/249 |
| 3,722,923 | 3/1973 | Grahl | 285/249 |
| 3,980,325 | 9/1976 | Robertson | 285/249 |
| 5,171,043 | 12/1992 | Ronda et al. | 285/238 |

FOREIGN PATENT DOCUMENTS 2398958  3/1979  France ................. 285/249

Primary Examiner—Andres Kashnikow
Assistant Examiner—Christopher G. Trainor
Attorney, Agent, or Firm—Charles B. Barris

[57] ABSTRACT

A blast nozzle holder for securing a blast nozzle and a supply hose thereto comprises a hollow holder body which includes a converging bore therethrough, a hollow securing nut which can be threaded into the bore of the holder body and a compression member which is pushed through the converging bore of the holder body by the securing nut and which is compressed around the exterior of the blast hose during passage through the converging bore so as to squeeze the exterior of the blast hose and hold same firmly in place in the holder body.

18 Claims, 2 Drawing Sheets

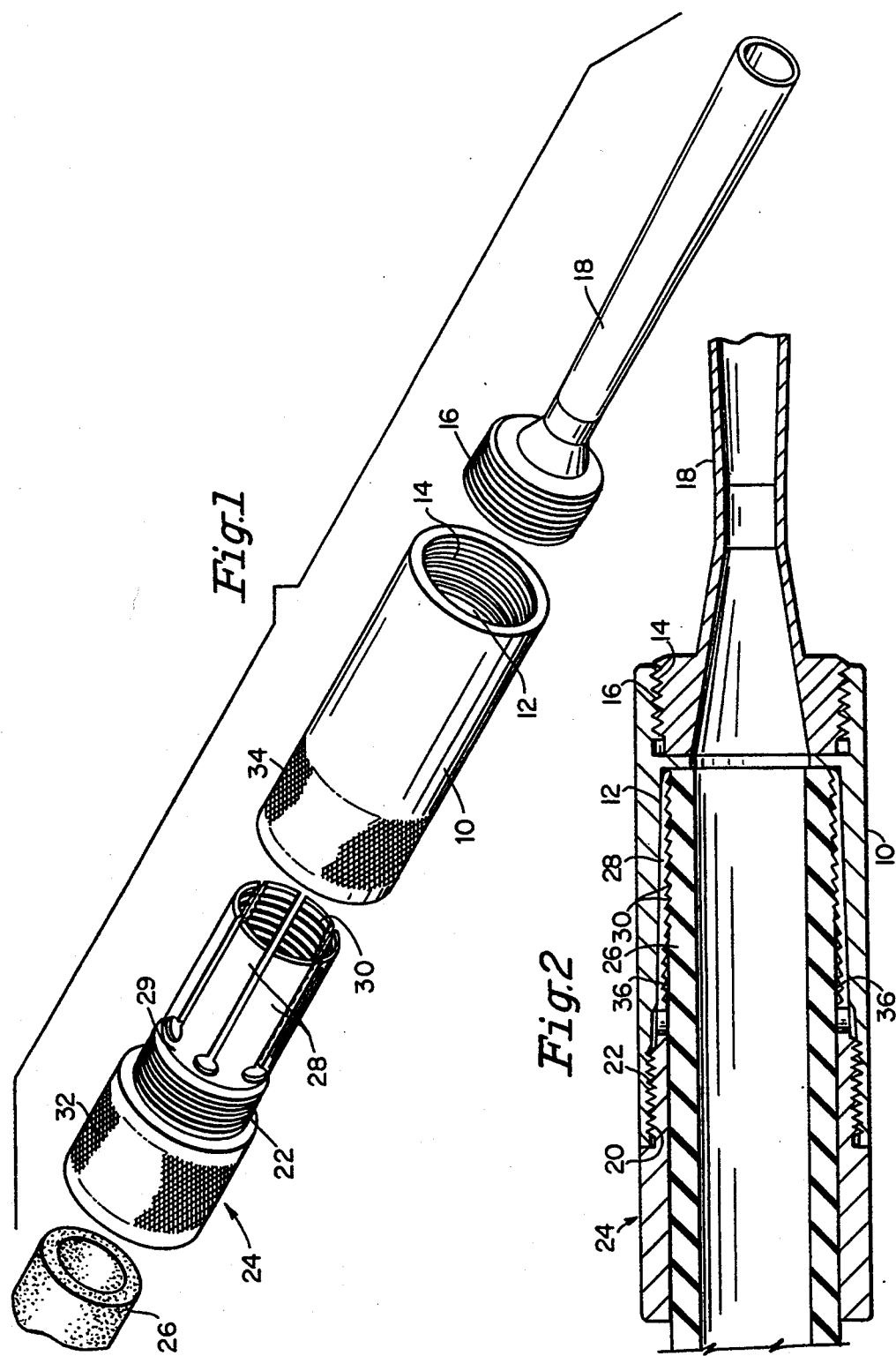

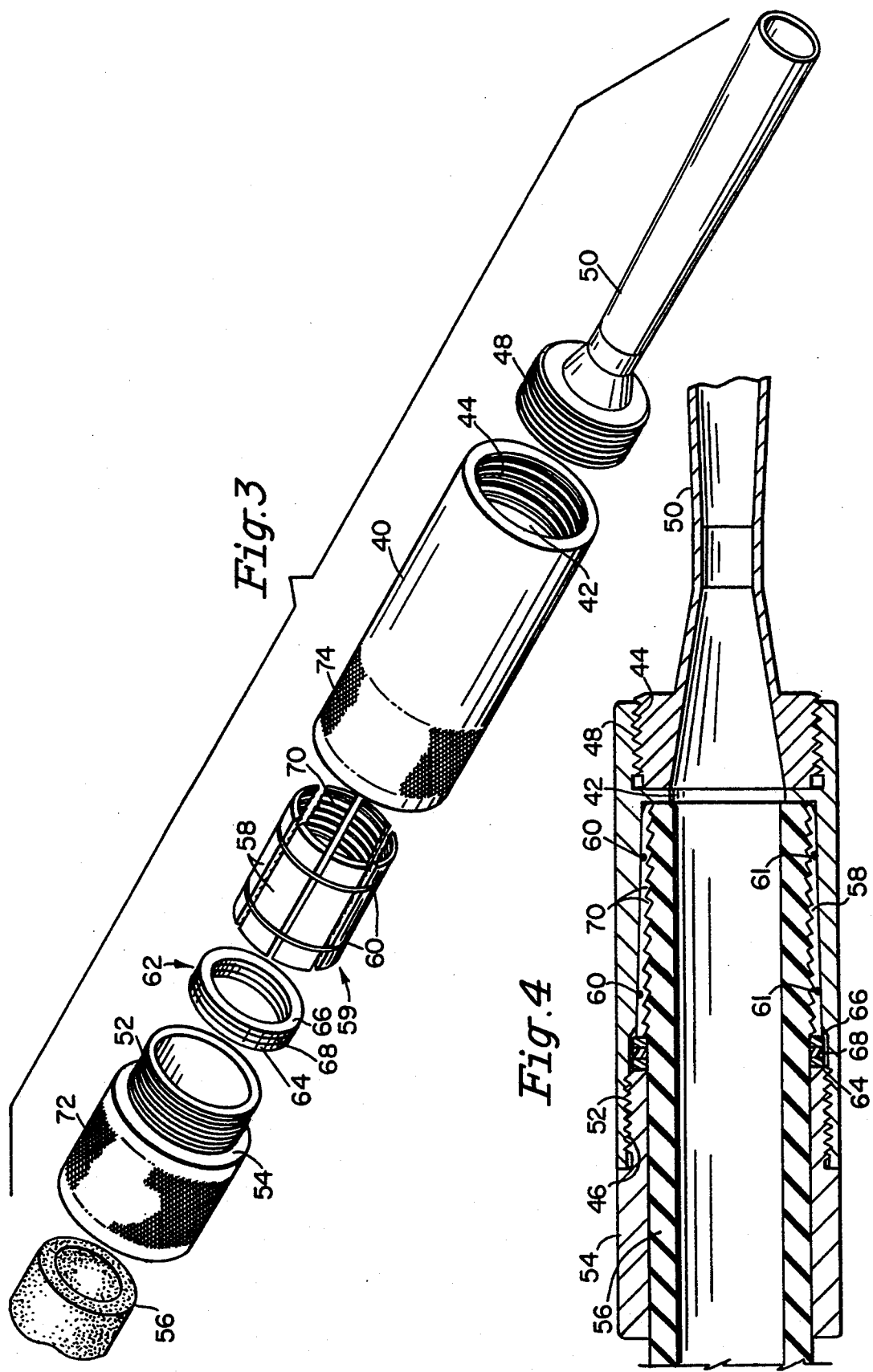

BLAST NOZZLE HOLDER

BACKGROUND OF THE INVENTION

1. Field of the Invention

The present invention relates generally to blast nozzles used to propel abrasive particles in a pressurized fluid such as air or water against a solid surface to remove adherent material, such as paint, scale, dirt, grease and the like therefrom. In particular, the present invention is directed to an improved blast nozzle holder which securely attaches the supply hose to the blast nozzle.

2. Description of the Prior Art

In order to clean a solid surface so that such surface can again be coated such as, for example, to preserve metal against deterioration, or simply to degrease a solid surface such as surfaces contacting food or building structures which contain food serving or food processing operations, it has become common practice to use an abrasive blasting technique wherein abrasive particles are propelled by a high pressure fluid against the solid surface in order to dislodge previously applied coatings, scale, dirt, grease or other contaminants. Various abrasive blasting techniques have been utilized to remove the coatings, grease and the like from solid surfaces. Thus, blasting techniques comprising dry blasting which involves directing the abrasive particles to a surface by means of pressurized air typically ranging from 30 to 150 psi, wet blasting in which the abrasive blast media is directed to the surface by a highly pressurized stream of water typically 3,000 psi and above, and a process in which both air and water are utilized either in combination at high pressures to propel the abrasive blast media to the surface or, in combination with relatively low pressure water used as a dust control agent or to control substrate damage have been used. Water for dust control has been mixed with the air either internally in the blast nozzle or exterior of the nozzle at the targeted surface to be cleaned and such latter process, although primarily a dry blasting technique, is considered wet blasting inasmuch as media recovery and clean up is substantially different from that utilized in a purely dry blasting operation.

The blast media or abrasive particles most widely used for blasting surfaces to remove adherent material therefrom is sand. Sand is a hard abrasive which is very useful in removing adherent materials such as paint, scale and other materials from metal surfaces such as steel. While sand is a most useful abrasive for each type of blasting technique, there are disadvantages in using sand as a blast media. For one, sand, i.e., silica, is friable and upon hitting a metal surface will break into minute particles which are small enough to enter the lungs. These minute silica particles pose a substantial health hazard. Additionally, much effort is needed to remove the sand from the surrounding area after completion of blasting. Still another disadvantage is the hardness of sand itself. Thus, sand cannot readily be used as an abrasive to remove coatings from relatively soft metals such as aluminum or any other soft substrate such as plastic, plastic composite structures, concrete or wood, as such relatively soft substrates can be excessively damaged by the abrasiveness of sand. Moreover, sand cannot be used around moving parts of machinery inasmuch as the sand particles can enter bearing surfaces and the like.

An alternative to non-soluble blast media such as sand, in particular, for removing adherent coatings from relatively soft substrates such as softer metals as aluminum, composite surfaces, plastics, concrete and the like is sodium bicarbonate. While sodium bicarbonate is softer than sand, it is sufficiently hard to remove coatings from aluminum surfaces and as well remove other coatings including paint, dirt, and grease from non-metallic surfaces without harming the substrate surface. Sodium bicarbonate is not harmful to the environment and is most advantageously water soluble such that the particles which remain subsequent to blasting can be simply washed away without yielding environmental harm.

A typical dry or wet blasting apparatus comprises a storage tank or pot to store and dispense an abrasive particulate media such as sand or bicarbonate into a highly pressurized fluid stream, a flexible hose to carry the fluid/blast media mixture to the blast nozzle and which allows the operator to move the blast nozzle relative to the surface to be cleaned and a blast nozzle which accelerates the abrasive blast media and directs same into contact with the surface to be treated. The blast nozzle is secured to the blast hose by means of a nozzle holder and is typically hand-held by the operator and moved relative to the targeted surface so as to direct the abrasive blast media across the entire surface to be treated.

The nozzle holder is used to attach the blast nozzle to the end of the blast hose allowing the nozzle to be quickly and easily changed to fit processing requirements which also may change during the course of the cleaning operation. Typically, the nozzle holder is "slip-fit" over the blast hose and is securely attached thereto via glue and screws which are threaded into the blast hose. Unfortunately, a common problem with this means to attach the blast hose to the blast nozzle is nozzle holder failure resulting in the nozzle holder separating from the blast hose during the blast cleaning operation. Most failures are caused by blast hoses having undersized outside diameters which reduce the snugness of the slip fit with the nozzle holder or by delamination of the blast hose especially around the areas in which the attachment screws have been threaded into the blast hose. The blast hoses are formed by multiple plies of rubber, the number of such plies depending upon the media which is being used. For example, if sand is the abrasive media, a rubber hose made of at least four plies and approximately $\frac{1}{2}$ inch thick is typically used so as to resist the abrasive nature of the sand. Such a hose is relatively stiff and it is difficult for the operator to readily manipulate the hand held blast nozzle. On the other hand, if a less dense blast media such as sodium bicarbonate is used, the supply hose does not need to be as thick as for use with sand and, typically, a two-ply blast hose having a thickness about $\frac{1}{4}$ inch has been found useful. Such hose is vastly more flexible than the supply hose used for sand and is readily manipulated by the operator. Each of the above-described supply hoses pose unique problems with respect to the attachment thereof in a nozzle holder. With a blast hose used to carry sand to the blast nozzle, the outside diameter of such hose can be uneven as it is common that as the multiple plies are wrapped upon each other differences in applied tension to the plies during the wrapping process causes the outer diameter of the supply hose to vary along the length of the hose. With respect to the more flexible hoses which comprise fewer rubber plies, the attachment screws which are used to secure the hose to the nozzle holder penetrate well into the thickness of the hose and after some time in use, the interior surface of the hose is worn down so as to expose the screws to the blast stream. Blast hose delamination initially occurs as the inside surface of the blast hose is subjected to the constant wear of the abrasive passing therethrough to the extent that the securing screws penetrate into the blast stream. The particulate blast media further weakens the hose around the penetration points resulting in the consequent delamination of the hose.

Accordingly, there is a need to provide a blast nozzle holder which can securely attach the blast hose to the blast nozzle and avoid separation of the blast hose during the blast cleaning operation.

Another need is to provide a blast nozzle holder which can securely attach the blast hose to the blast nozzle in such a manner so as to not adversely effect the integrity of the blast hose. Thus, it would be worthwhile to provide a nozzle holder which can securely attach the blast hose to the blast nozzle without utilizing attachment screws which must be threaded into the blast hose.

The objectives of the present invention are such to meet the above described needs and provide a nozzle holder which can securely attach the blast hose to the blast nozzle without adversely affecting the integrity of the blast hose.

Another objective of the present invention is to provide a blast cleaning process utilizing sodium bicarbonate as the blast media wherein the supply hose which carries the sodium bicarbonate to the blast nozzle is secured thereto by a nozzle holder without adversely altering the integrity of the supply hose.

SUMMARY OF THE INVENTION

The objectives of the present invention are achieved by providing a nozzle holder which can secure the blast hose to the blast nozzle by use of a compression means which squeezes the exterior of the blast hose without penetrating into the interior thereof. The nozzle holder is formed of a hollow holder body which converges along its length toward the end thereof where the blast nozzle is attached. A compression means is placed in the interior of the holder body and around the blast hose. As the blast hose is pushed through the nozzle holder toward the blast nozzle, the compression means clamps down and squeezes the exterior of the blast hose and holds same in the nozzle holder body. There are no attachment screws which penetrate into the thickness of the blast hose and which has been the cause of delamination of the blast hose and moreover, the compression means can accommodate for varying thicknesses along the length of the blast hose to snugly secure the blast hose within the nozzle holder.

BRIEF DESCRIPTION OF THE DRAWINGS

FIG. 1 is an exploded view of the nozzle holder, supply hose and blast nozzle for one embodiment of the invention.

FIG. 2 is a cross-sectional view of the nozzle holder of FIG. 1 holding both the supply hose and the blast nozzle.

FIG. 3 is an exploded view of an alternative nozzle holder, supply hose and blast nozzle.

FIG. 4 is a cross-section of the alternative nozzle holder of this invention holding the supply hose and blast nozzle.

DETAILED DESCRIPTION OF THE INVENTION

The blast nozzle holder of the present invention can be used to hold any type of blast nozzle capable of accelerating and directing an abrasive media entrained in a pressurized fluid stream to a targeted surface to remove contaminants therefrom. Typically, such blast nozzles are venturi-type nozzles containing a converging inlet section, a venturi-orifice and a diverging outlet section which leads to an outlet. Widely used are venturi-type blast nozzles which have a circular cross section. These are characterized as round nozzles. Other nozzles may be used including fan nozzles in which the diverging outlet section is in the shape of a fan and the outlet is rectangular or elliptical. The type of abrasive also is not critical to this invention. However, the blast nozzle holder of this invention is particularly useful in blasting with sodium bicarbonate, since the supply hose for such blast media is relatively thin compared to the supply hose used for blasting with sand. Consequently, such blast hose cannot readily accommodate the attachment screws which were used in the prior art to hold the supply hose within the nozzle holder.

Two alternative, but very similar nozzle holders are provided by the present invention. The first embodiment is shown in FIGS. 1 and 2. As illustrated therein, the blast nozzle holder includes a hollow nozzle holder body 10 which contains a bore 12 therethrough. Bore 12 includes internal threads 14 at one end thereof which mate with threads 16 of blast nozzle 18 so that blast nozzle 18 can be securely held at one end within body 10. On the opposite end of bore 12 which contains threads 14 are internal threads 20 which mate with external threads 22 of securing nut 24. Bore 12 converges slightly in the longitudinal direction from the end which contains threads 20 to the end which contains threads 14. Securing nut 24 is also hollow and when threaded into body 10 can accommodate the placement of supply hose 26 therethrough.

Attached to securing nut 24 and downstream of threads 22 are a plurality of elongated teeth 28 which are spaced around the circumference of securing nut 24. Teeth 28 fit within bore 12 as securing nut 24 is threaded into body 10. Teeth 28 encircle and contact the exterior surface of supply hose 26 as supply hose 26 is placed through securing nut 24 and into bore 12 of body 10. As securing nut 24 is threaded into body 10 by rotation of nut 24 and the engagement of threads 22 with threads 20 in body 10, teeth 28 move longitudinally through bore 12. Teeth 28 compress from the attachment point 29 thereof to securing nut 24 due to contact with the interior surface of body 10 which forms converging bore 12 and begin to squeeze supply hose 26. On the bottom of teeth 28 are a series of ridges 30 which grip the exterior of hose 26 without excessive penetration into the thickness of the hose. The ridges 30 act merely as a nonslip surface. As nut 24 is fully threaded within body 10, the spaced teeth 28 squeeze and securely hold hose 26 within bore 12 by means of the compression of the teeth 28 via the converging bore 12 of body 10. By this manner, hose 26 is held securely in place and no attachment screws have to be threaded into the body of the hose which can cause delamination during the blast cleaning operation. Moreover, the compression action of the spaced teeth 28 accommodates for any uneven thickness of the supply hose along the longitudinal length thereof and thereby insures a secure grip on hose 26 within body 10. Knurled areas 32 and 34 on securing nut 24 and body 10, respectively, aid in threading nut 24 by hand into body 10.

The second embodiment of the blast nozzle holder is shown in FIGS. 3 and 4 and is essentially identical to the blast nozzle holder shown in FIGS. 1 and 2 except that the teeth which compress and squeeze the exterior of the supply hose to hold same in the holder body are separate from the securing nut. In the embodiment shown in FIG. 2, there may exist a space 36 between teeth 28 and hose 26 adjacent attachment point 29. Thus, hose 26 may not be fully held by the total area of teeth 28. In the alternate embodiment illustrated in FIGS. 3 and 4, nozzle holder body 40 includes a bore 42 therethrough and a set of internal threads 44 and 46 on opposite sides of the bore 42. Threads 44 mate with threads 48 of blast nozzle 50 to hold blast nozzle 50 securely within body 40. Threads 46 mate with threads 52 in securing nut 54. Nut 54 is hollow and can accommodate blast hose 56 therethrough. Blast hose 56 is also directed through bore 42 so as to be contiguous with the inlet of blast nozzle 50 as it is threaded into body 40.

Bore 42 converges slightly from end to end along the longitudinal direction from threads 46 to threads 44. Placed around hose 56 are a plurality of teeth 58. The teeth 58 are separate from securing nut 54 and can be held onto the exterior of hose 56 by means of one or more elastic o-rings 60 which fit within grooves 61 placed across the surface of teeth 58. Alternatively, the separate teeth 58 can be molded and held together by a connecting band which is molded with the separate teeth 58 to form a tooth assembly 59. Placed between tooth assembly 59 and securing nut 54 is a bearing ring 62. Bearing ring 62 can comprise any type of bearing surface which will press against the end of tooth assembly 59 while nut 54 is being threaded into body 40 and allow rotation of nut 54 without rotation of the teeth 58 around the exterior of hose 56 which may cause misalignment of the separate teeth 58. Bearing ring 62 preferably comprises two spaced metal rings 64 and 66 and a friction-resistant ring 68 therebetween such as formed of a fluorocarbon including Teflon®. As securing nut 54 is threaded into body 40, metal ring 64 may rotate due to the rotation of the nut 54 but will slide along friction-resistant ring 68 allowing bearing ring 66 to remain stationary and provide for a pushing action to move tooth assembly 59 through converging bore 42. As nut 54 is threaded into body 40, and tooth assembly 59 moves through bore 42, the teeth 58 will be forced to compress upon the exterior surface of the hose 56. When nut 54 is fully threaded within body 40, the teeth 58 are squeezed against the exterior of supply hose 56 and securely hold hose 56 within bore 42 of body 40. Again, teeth 58 can include a plurality of bottom ridges 70 to better grip the exterior surface of hose 56. Such ridges are not large enough to penetrate into the body of hose 56 but simply provide a nonslip surface so that the hose 56 can be held tightly in place. Because the teeth 58 are not cantilevered to nut 54, the whole bottom surface area of teeth 58 engage hose 56. Again, knurled surfaces 72 and 74 on nut 54 and body 40, respectively, provide an improved gripping surface for threading nut 54 by hand into body 40.

The nozzle holder of this invention can be formed of metal, plastic or a combination of the two. Unlike the prior art, the blast hose is not penetrated by any securing screws but only squeezed at the surface so as to hold the hose tightly within the nozzle holder between the blast nozzle and the securing nut. The compression means of the nozzle holder of this invention can accommodate for different thicknesses of the supply hose along the length thereof and does not adversely affect the integrity of the plies of the blast hose so as to cause delamination during the blast cleaning operation.

What is claimed is:

1. A nozzle holder for holding a blast nozzle and a supply hose contiguous with said blast nozzle, comprising: a hollow nozzle holder body having a bore therethrough to form first and second ends, said second end having means to secure said blast nozzle, said bore containing an interior surface converging longitudinally toward said second end, a compression means capable of contacting said interior surface and movable through said bore from said first end toward said second end, substantially all of said compression means capable of being in contact with said converging interior surface for squeezing the exterior of said supply hose passed into said holder body for securing said supply hose therein adjacent said second end as said compression means moves through said bore, a securing nut contiguous with and upstream of said compression means for pushing said compression means through said bore.

2. The blast nozzle holder of claim 1 wherein said compression means is attached to said securing nut, said first end having means to attach said securing nut thereto and allow said securing nut to move from said first end toward said second end of said holder body.

3. The blast nozzle holder of claim 2 wherein said compression means comprises a plurality of elongated teeth secured to an end of said securing nut.

4. The blast nozzle holder of claim 3 wherein the surface of said teeth which contact the exterior of said supply hose comprises a plurality of ridges to form a nonslip surface against said blast hose.

5. The blast nozzle holder of claim 2 wherein said means to secure said blast nozzle includes internal threads at said second end of said bore.

6. The blast nozzle holder of claim 5 wherein said means to attach said securing nut comprises internal threads at said first end of said bore.

7. The blast nozzle holder of claim 6 wherein a portion of the exterior surface of said securing nut and said nozzle holder body are knurled to aid in threading said securing nut into said holder body by hand.

8. The blast nozzle holder of claim 1 wherein said first end has means to attach said securing nut thereto and allow said securing nut to move and push said compression means from said first end toward said second end, said compression means being separate from said securing nut.

9. The blast nozzle holder of claim 8 wherein said compression means comprise a plurality of elongated teeth.

10. The blast nozzle holder of claim 9 wherein said plurality of elongated teeth are formed as an assembly capable of being secured to the exterior of said supply hose passed through said holder body.

11. The blast nozzle holder of claim 10 wherein said assembly is formed by at least one elastic o-ring around said teeth.

12. The blast nozzle holder of claim 9 including a bearing ring means between said securing nut and said compression means.

13. The blast nozzle holder of claim 12 wherein said bearing ring means comprises a first bearing ring in contact with said securing nut and a second bearing ring in contact with said compression means.

14. The blast nozzle holder of claim 13 including a friction-resistant bearing ring between said first and second bearing rings.

15. The blast nozzle holder of claim 8 wherein said means to secure said blast nozzle includes internal threads at said second end of said bore.

16. The blast nozzle holder of claim 15 wherein said means to attach said securing nut comprises internal threads at said first end of said bore.

17. The blast nozzle holder of claim 16 wherein the exterior surface of said securing nut and said nozzle holder body are knurled to aid in threading said securing nut into said holder body by hand.

18. The blast nozzle holder of claim 9 wherein the surface of said teeth which contact the exterior of said supply hose comprises a plurality of ridges to form a nonslip surface against said supply hose.

* * * * *